United States Patent [19]
Waterman et al.

[11] Patent Number: 6,033,689
[45] Date of Patent: Mar. 7, 2000

[54] ANIMAL FEED COMPOSITION OF SOLUBLE SUGAR AND DICARBOXYLIC ACID

[75] Inventors: Douglas F. Waterman, Madison, N.Y.; Scott M. Engel, Fennimore, Wis.; Trevor Tomkins, Sycamore, Ill.

[73] Assignee: Milk Specialities Company, Dandee, Ill.

[21] Appl. No.: 08/801,082

[22] Filed: Feb. 14, 1997

[51] Int. Cl.[7] ............................ A01K 29/00; A23L 29/00
[52] U.S. Cl. .................... 426/2; 426/71; 426/72; 426/630; 426/639; 426/807; 424/438; 424/442
[58] Field of Search .................... 426/2, 71, 72, 426/807, 630, 639; 424/438, 442

[56] References Cited

U.S. PATENT DOCUMENTS

| | | | |
|---|---|---|---|
| 4,160,041 | 7/1979 | Schroeder et al. | 426/69 |
| 4,547,386 | 10/1985 | Chambers et al. | 426/583 |
| 4,820,527 | 4/1989 | Christensen et al. | 426/2 |
| 5,023,091 | 6/1991 | Winowiski | 426/2 |
| 5,213,826 | 5/1993 | Miller et al. | 426/2 |
| 5,585,134 | 12/1996 | Cummings et al. | 426/630 |
| 5,589,186 | 12/1996 | Isobe et al. | 424/438 |

*Primary Examiner*—Nina Bhat
*Attorney, Agent, or Firm*—Joe D. Calhoun; Philips Summa

[57] ABSTRACT

The composition of one or more selected soluble sugars and one or more selected dicarboxylic acids into a feed supplement for ruminant animals that maintains the appropriate level of lactic acid and pH of the rumen, and optimizes the availability of energy and nutrients for milk production or growth. The composition also includes one or more selected mineral salts and/or fat, fiber or flavor freshener. An improved animal feed, a method of improving animal feed, and a method of feeding the compositions sufficient to provide the rumen a pH in the range of about 6 to 7, and to increase the amount of digestible protein in the lower intestine by increasing microbial protein synthesis in the rumen

36 Claims, No Drawings

ANIMAL FEED COMPOSITION OF SOLUBLE SUGAR AND DICARBOXYLIC ACID

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to the field of animal feed and animal nutrition. This invention relates primarily to the field of nutrition for ruminant animals, especially dairy cows. There is a constant need to improve the economical feeding of such animals to maximize the availability of nutrients (and often milk production), and to minimize the factors reducing animal growth and the quantity and quality of milk production.

2. Background Information

Ruminant animals, especially dairy cows, often experience reduced milk production during early lactation. Such depressed milk production is believed to be the result of the decreased supply of protein to the small intestine and the general diversion of energy accompanying lactation. These results are believed to be attributable to inefficient rumen microbial functioning caused, at least in part, by the ruminant's inability to maintain a desired microbial population that provides a desired flow of nutrients to the lower gut. To counteract such reduced milk production, the dairy industry has traditionally overfed protein and/or supplemented the ruminant diet with high levels of undegradable protein. However, unless sufficient energy is also supplied, overfeeding protein is often wasteful because it may result in the loss of unused ammonia nitrogen. Supplementing the diet with high levels of undegradable protein is often cost prohibitive.

Non-structural carbohydrates that are readily fermented in the rumen can be added to the diet to increase the utilization of ruminal ammonia nitrogen for microbial protein synthesis. (Casper & Schingoethe, J. Dairy Sci., 72:928 (1989); Schingoethe et al., J. Dairy Sci., 66:2515 (1983).) Such soluble sugars probably provide rumen microbes with energy for synthesizing protein using ruminal ammonia nitrogen; if adequate energy is not available for such microbial growth and protein synthesis when the ruminal ammonia is available, much of the ammonia nitrogen remains unused and is eventually lost as urea. Feeding whey, containing lactose, stimulates total ruminal microbial protein synthesis, particularly by the bacteria of the rumen. (Winschitl et al., J. Dairy Sci. 67:3061–3068 (1984).)

One concern with the feeding of high levels of soluble sugars, such as lactose, to a ruminant is the accumulation of lactic acid in the rumen. Lactic acid is produced from the fermentation of carbohydrates by the rumen microbes. High levels of lactic acid in the rumen tend to lower rumen pH, leading to laminitis and digestive upset caused by acidosis in the rumen. It has recently been shown that supplementing the ruminant diet with malic acid and fumaric acid increases the uptake and utilization of lactic acid by ruminal bacteria such as Selenomonas Ruminantium. (Nisbet et al., J. Anim. Sci., 72:1355–1361 (1994); Nisbet et al., Current Microbiology, 26:133–136 (1993).)

SUMMARY OF THE INVENTION

The present invention primarily includes (without limitation) an animal feed supplement composition comprised of one or more soluble sugars combined with one or more dicarboxylic acids to provide an animal feed supplement primarily beneficial to ruminant animals, including cows; the invention also includes a method for using such composition in feeding such animals. Other embodiments include (without limitation) the addition of such ingredients as one or more: mineral salts; soluble proteins; and/or flavor enhancers.

It is now believed that maximizing protein synthesis by microbes in the rumen is an economical way to increase the protein supply to the small intestine of the ruminant, and to thereby increase milk production, milk protein percentage or animal growth; for the sake of convenience, such benefits may be characterized collectively as increasing bodily productivity. Ruminal microbes increase the synthesis of protein by self-propagation, among other means. Protein synthesis may be increased by supplementing the ruminant diet with soluble sugars, to provide extra substrate and energy for protein synthesis; alternatively, growth of rumen microbes may be catalyzed by the addition of certain carboxylic acids. The invention disclosed herein combines both theories to exponentially increase the production of microbial protein, greater than the increase provided by merely using both approaches separately.

It is believed that dicarboxylic acids such as malic acid and fumaric acid prevent the rumen pH from becoming too acidic, by increasing the uptake of lactic acid by ruminal bacteria. It is also believed that the effectiveness of malic acid in this regard is dependent upon the presence of high levels of mineral salts such as sodium chloride in the rumen. It is currently believed that each cow should ingest a minimum of between about 0.25 pound and 0.50 pound of lactose and 10 mMoles of malic acid per day.

Besides providing energy, the soluble sugars of the invention disclosed herein contribute to the mineral salt pool of the rumen, resulting in increases in both the fluid volume in the rumen and the dilution rate. The dicarboxylic acids of the invention provide improved uptake and utilization of lactic acid in the rumen by the microbes, especially Selenomonas Rumininatium. The combination of the whey permeate and the dicarboxylic acids provides unexpectedly enhanced desirable results consistent with the objects of the invention, as set forth more fully hereinbelow.

For the sake of simplicity and to give the claims of this patent application the broadest interpretation and construction possible, the following definitions will apply to this application:

a. "provide" means to provide, augment, facilitate, achieve, maintain, grow, recreate or otherwise result in the characteristic(s) made relevant by the context of the sentence containing said term; and b. "desired" or "desirable" means desirable, necessary, optimal and/or any similar term made appropriate or desirable by the context of the sentence containing said term. Similarly, the conjunctive "and" may also be taken to include the disjunctive "or", and vice versa, for the sake of simplicity and whenever necessary to give the claims of this patent application the broadest interpretation and construction possible. And whenever a particular class of ingredient is specified, such as dicarboxylic acid or sugar, any one or combination of the members within such class or selection group may be used unless the embodiment is expressly limited to a particular member.

The invention is not generally limited by the source of such sugar or acid, or the source of any other ingredient, unless so limited expressly or by implication. Although the composition of whey or whey permeate is variable, depending upon its processing, in general its weight is comprised of between about 50% and 80% lactose, between about 5% and 20% ash (mineral salts), and between about 5% and 20% protein. The whey permeate used in the tests disclosed herein was comprised of about 80% lactose, about 13% ash and about 7% protein. For the purposes of this application, it is presumed that the composition of whey or whey permeate is that which will provide any or all of the desired characteristics that are the objects of the invention disclosed herein.

It is an object of the present invention to provide a novel animal feed supplement composition that provides the desired: (1) level of lactic acid and/or pH in the intestines; (2) level of microbial protein synthesis; and (3) quality or quantity of nutrients and/or energy for use by the animal. It is another object of the present invention to provide a novel method of feeding said composition. Another object of the invention is to provide for the economical feeding of such ruminants by minimizing the factors preventing animal growth, or reducing the quantity or quality of milk production. This includes (without limitation) to provide a desired: increase in uptake and utilization of lactic acid; readily fermentable source of non-structural carbohydrates such as soluble sugars to the rumen; increase in the utilization of ruminal ammonia; increase in microbial protein synthesis; higher milk yield; higher milk protein percentage; energy source for rumen microbes; improvement of non-protein nitrogen utilization by rumen microbes; decrease in rumen ammonium, blood urea and urinary nitrogen excretion; increase in ruminal bacteria count, especially Selenomonas Ruminantium; decrease in ruminal protozoa count; increase in the dilution rate of ruminal fluid; increase in the turnover rate of ruminal fluid; and improvement in feed efficiency. Other objects are apparent from the four corners of this application.

DETAILED DESCRIPTION OF THE INVENTION

The invention is primarily a composition of at least one soluble sugar and at least one dicarboxylic acid, in the effective range of amounts or percentages of weight to provide the desired level of lactic acid, pH balance and protein synthesis in the gastrointestinal tract, especially in the rumen, and the desired nutrients and energy for use by the animal.

The soluble sugars are comprised primarily of lactose, sucrose, dextrose and maltodextrin; other soluble sugars in the selection group include maltose, fructose, xylose, galactose and ribose, and mixtures of any of the sugars listed in the selection group. One of the important characteristics common to each such soluble sugar, supporting the inclusion of each in this particular group, is that each such soluble sugar is a source of energy which is readily fermented in the rumen relative to more complex carbohydrates; each likely improves non-protein nitrogen utilization by rumen microbes. Another common characteristic attributable to each such soluble sugar, important in the context of this invention, is increased uptake of ammonia from the rumen, resulting in additional microbial protein synthesis. For each sugar mentioned herein that has no test data reflected herein expressly confirming the suitability for inclusion in this selection group, such suitability is predicated upon (and predicted from) its known or suspected trait as a readily fermentable source for protein synthesis under similar circumstances.

The dicarboxylic acids of the invention are primarily comprised of L-malic acid, D-malic acid, L-fumaric acid and D-fumaric acid; other dicarboxylic acids in the selection group include aspartic acid, citric acid, succinic acid, lactic acid and pyruvic acid, and mixtures of any of the carboxylic acids listed in the selection group. One of the important characteristics common to each such acid, supporting the inclusion of each in this particular group, is that each appears to stimulate the utilization of lactic acid by rumen microbes, and thereby result in an increased rumen pH. Another common characteristic, important in the context of this invention, is (it is hypothesized) that each organic acid overcomes the deficiency of oxaloacetate in the rumen owing to gluconeogenesis. For each acid mentioned herein that has no test data reflected herein expressly confirming the suitability for inclusion in this selection group, such suitability is predicated upon (and predicted from) its known or suspected trait as a stimulant of lactic acid utilization by rumen microbes under similar circumstances.

One embodiment of the animal feed supplement composition comprises the above ingredients combined in the following ranges of percentages of ingredient weight to total composition weight: between about 50% and 98% soluble sugar, preferably about 78.4% (and preferably a mixture including lactose, sucrose, dextrose and maltodextrine); and between about 0.5% and 10% dicarboxylic acid, preferably about 1.8% (and preferably either D,L-malic acid, or a mixture of L-malic acid and L-fumaric acid).

Another embodiment of the animal feed supplement composition further comprises at least one mineral salt. The mineral salts in the selection group are primarily comprised of sodium chloride, potassium chloride, and calcium chloride; other mineral salts in the selection group include zinc sulfate, magnesium sulfate, copper sulfate and sodium bicarbonate, and mixtures of any of the salts listed in the selection group. One of the important characteristics common to each such salt, supporting the inclusion of each in this particular group, is that each salt appears to increase the dilution rate in the rumen; with an increase in rumen fill, there in an increase in the outflow of soluble nutrients to the small intestine. For each salt mentioned herein that has no test data reflected herein expressly confirming the suitability for inclusion in this selection group, such suitability is predicated upon (and predicted from) its known or apparent trait as a salt that, under similar circumstances, increases the dilution rate in the rumen or otherwise increases the outflow of soluble nutrients to the small intestine.

One embodiment of the animal feed supplement composition comprises at least one of each type of the following ingredients combined in the following ranges of percentages of ingredient weight to total composition weight: between about 50% and 98% soluble sugar, preferably about 78.4%; between about 0.5% and 10% dicarboxylic acid, preferably about 1.8%; and between about 5% and 20% mineral salt, preferably about 10.5%.

Another embodiment of the animal feed supplement composition comprises at least one of each type of the following ingredients combined in the following ranges of percentages of ingredient weight to total composition weight: between about 50% and 98% soluble sugar, at least some of said soluble sugar being comprised of lactose (preferably in the amount of about 75%), plus dextrose and maltodextrin (preferably in the combined amount of about 1%), and sucrose (preferably in the amount of about 2.4%); and between about 0.5% and 10% dicarboxylic acid, at least one of said dicarboxylic acid being comprised of L-malic acid (preferably in the amount of about 0.9%). An embodiment may also optionally include between about 5% and 20% mineral salt (preferably in the amount of about 10.5%), at least one of said mineral salt being comprised of sodium chloride.

The sources of some of said ingredients are critical aspects of some of the embodiments of the animal feed supplement combination. By weight, whey permeate is generally comprised of about 80% lactose and about 13% mineral salt such as sodium chloride. The inclusion of said ingredients in the ruminant diet, together with a dicarboxylic acid such as L-malic acid or L-fumaric acid, enhances several desired objects of the invention. The lactose provides an energy source for increased microbial protein synthesis, and increased milk yield; the dicarboxylic acid provides decreased lactic acid level in the rumen, while the mineral salt increases the amount of rumen fluid fill, together with the rumen dilution rate and turnover rate. The result is that the pH of the rumen remains within the desired weakly-acidic pH range of between about 6 and 7 desired to avoid acidosis. The combination of soluble sugar and dicarboxylic acid also enhances the protein synthesis provided by the rumen microbes, increasing protein synthesis and milk production more than any enhancement provided by the mere use of both ingredients separately. The combination of soluble sugar and decarboxylic acid produces unexpectedly high enhancements of bodily productivity, suggesting the action of a previously unknown or unrecognized synergy.

Another embodiment of the animal feed supplement composition is comprised of at least one of each type of the following ingredients: whey permeate as a source of at least one of said soluble sugars or mineral salts, said whey permeate being condensed to a range of between about 40% and 65% solids (weight of solids v. total weight), with a preferred level of about 50% solids; and corn syrup solids as a source of at least one of said soluble sugars. Embodiments may optionally include one or more of: fat such as edible lard or tallow, or mixtures thereof; and/or milk flavor enhancer such as milk bud or milk freshener, or mixtures thereof. Another embodiment of the animal feed supplement composition includes the combination of the aforementioned ingredients to provide approximately the following percentages of ingredient weight to total composition weight: between about 50% and 98% whey permeate, preferably about 93.8%; between about 0.5% and 20% combined dextrose and maltodextrin, preferably a combined amount of about 1%; between about 1% and 10% corn syrup solids, preferably about 2.375%; between about 0.5% and 10% dicarboxylic acid, preferably about 1.8% of combined D,L-malic acid; between about 0.5% and 5% fat, preferably about 1% fat such as edible lard or tallow; and between about 0% and 2% flavor enhancer, preferably about 0.025% flavor enhancer such as milk bud or milk freshener.

Another embodiment of the invention includes mixing a batch of one of the above compositions at temperatures in the range of 90 degrees Fahrenheit to 100 degrees Fahrenheit. That mixture is then transferred into a surge tank for holding until dried. Thereafter the mixture passes through at least one strainer en route to a homogenizer standard in the dairy or drying process industry. Thereafter the mixture is pumped by at least one high pressure spray nozzle past hot air onto a belt conveyor spray dryer standard in the dairy industry.

In another embodiment of the invention, the whey permeate is preheated in the approximate range of 160 to 170 degrees Fahrenheit; the preferred temperature is 150° F. Such preheated whey permeate is then condensed in an evaporator standard to the animal feed manufacturing industry, until the composition is approximately 40% to 65% solids; the preferred concentration is approximately 50% solids. The condensed whey permeate is then cooled using tube coolers standard in the animal feed manufacturing industry, at temperatures ranging from 70° to 90° F; the preferred cooling range is approximately 75° to 85° F. The whey permeate is then cooled further in agitating crystalizers standard in the animal feed manufacturing industry. Any crystalizing agent or seed may be added, including (without limitation) wheat starch, soy flour, lactose or whey. The whey permeate remains at this stage until crystalized, after which time it is combined with the dicarboxylic acid(s) and any other ingredient(s) specified above.

Another facet of the invention comprises a method of maximizing protein synthesis by microbes in the rumen to increase the protein supply to the small intestine of the ruminant, and to thereby increase milk production, increase milk protein percentage or animal growth, while preventing the rumen pH from becoming too acidic, by increasing the uptake of lactic acid by ruminal bacteria. This includes a method of improving bodily productivity in animals, comprising feeding any of the animal feed supplements described herein in amounts sufficient to provide the rumen a pH in the range of about 6 to 7, and to increase the amount of digestible protein in the lower intestine by increasing microbial protein synthesis in the rumen.

This also includes a method of improving bodily productivity of animals, comprising combining any feed supplement described herein with animal feed and feeding said combination to the animal in an amount sufficient to assure it consumes between about 0.3 pound and 1.0 pound of said feed supplement per day. Such method is especially recommended for animals previously having a diet high in soluble protein and/or low in non-structural carbohydrates. Also included is an improved animal feed composition comprising a mixture of animal feed and any of the animal feed supplements described herein, in amounts sufficient to provide the rumen a pH in the range of about 6 to 7, and to increase the amount of digestible protein in the lower intestine by increasing microbial protein synthesis in the rumen.

Another embodiment of the invention is comprised of a method of using the feed supplement composition to improve bodily productivity of animals, including (without limitation) the feeding of any of the aforementioned embodiments of the feed supplement to ruminant animals in amounts sufficient to provide the desired availability of nutrients and the desired pH of the gastrointestinal tract, especially the rumen, in the range of approximately 6.0 to 7.0. In one particular embodiment of this method, between about 0.3 pound and 1.0 pound of the animal feed supplement composition is fed per cow per day. At least 0.25 pound of soluble sugar should be consumed per day by each cow.

FIELD TRIAL RESULTS

TRIAL 1: EFFECTS OF DICARBOXYLIC ACID SUPPLEMENTATION IN THE DIETS OF LACTATING HOLSTEIN COWS

Objective: To evaluate the effect on daily milk yield and dry matter intake of cows with diets supplemented with dicarboxylic acids.

Materials & Methods: Four Holstein cows varying in days in milk were selected for this field trial. Daily dry matter intakes and milk yields were recorded for 2 days prior to the initiation of treatment. Milk yields and dry matter intake were recorded for the 8 day treatment period. Tank weights were recorded to estimate the daily milk yield per cow within the herd. This may account for any differences due to environment and/or diet.

Diet: Cows were fed a total mixed ration; the basal diet was approximately 50:50 corn silage and alfalfa haylage, on a dry matter basis. In addition, the diet included high moisture corn, cottonseed, by-pass fat and by-pass protein. On a dry matter basis the diet was:

18.6% crude protein
5.4% soluble protein
7.3% undegradable protein
19.2% acid detergent fiber
28.7% nutrient detergent fiber
38.7% non-fibrous carbohydrates Cows were fed approximately 7 pounds of dry matter from alfalfa hay at the end of the day.

Results: The data would suggest an increase in daily milk yield was a result of supplementing the diet with the dicarboxylic acids. The tank weights indicate daily output per cow was increased 1.0 pounds per cow per day. However, the cows supplemented with the dicarboxylic acids increased daily yields by 3.28 pounds. The potential milk yield response as a result of the dicarboxylic acids is estimated to be approximately 2.0+pounds per cow per day. (Table 1.)

The addition of dicarboxylic acids to the diet of lactating cows does not appear to have any negative effects on dry matter intake. (Table 2.)

TABLE 1

Effect of Dicarboxylic Acid Supplementation on Milk Yield of Lactating Holstein Cows

| | Daily Milk Yield | | | |
|---|---|---|---|---|
| | Cows 1 | Cow 2* | Cow 3** | Cow 4 | Tank |
| Pretreatment | 83.5 | 105.0 | 66.0 | 105.0 | 70.4 |
| Treatment (8d) | 92.0 | 103.2 | 70.6 | 106.8 | 71.4 |
| Difference | +8.5 | −1.8 | +4.6 | +1.8 | +1.0 |

*Expressed standing heat (day 7).
**Clinical mastitis (day 2).

Cows averaged 3.28 pound increase. Tank average 1.0 pound increase. Milk yield response attributable to the dicarboxylic acids is estimated to be 2.28 pounds per day.

TABLE 2

Effect of Dicarboxylic Acid Supplementation on Dry Matter intake of Lactating Holstein Cows

| | Daily Milk Yield | | | |
|---|---|---|---|---|
| | Cows 1 | Cow 2 | Cow 3 | Cow 4 |
| Pretreatment | 60.1 | 52.6 | 58.4 | 58.4 |
| Treatment (8d) | 61.0 | 62.2 | 61.0 | 60.0 |
| Difference | +0.9 | +9.6 | +2.6 | +1.6 |

Research conducted at State University of New York at Morrisville.

TRIAL 2: EFFECT OF SUPPLEMENTING RATIONS OF TO LACTATING JERSEY COWS

Objective: Determine the effect on milk yield when the rations of jersey cows are supplemented with a combination of soluble sugars, dicarboxylic acids and mineral salts. The trial combination was comprised of: 78.4% soluble sugars, 1.8% D, L malic acid and 14% ash, with the remainder comprised of protein, fiber and flavor enhancer.

Method: A split plot design using 50 lactating Jersey cows per group each received 1/2 pound of the trial combination for 30 days. Average quality corn silage was fed.

Results: Average 4 pounds more milk in each group fed trial combination. Increase of 0. 1% in milk protein.

We claim:

1. An animal feed supplement composition comprising soluble sugar, dicarboxylic acid selected from the group of L-malic acid, D-malic acid, L-fumaric acid, D-fumaric acid, aspartic acid, citric acid, succinic acid, lactic acid and pyruvic and mixtures thereof, fat and flavor enhancer, in the following approximate percentages of ingredient weight to total composition weight:

a. soluble sugar of about 93.8% whey permeate, about 1.0% combined dextrose and maltodextrin, and about 2.375% corn syrup solids;
b. about 1.8% dicarboxylic acid;
c. about 1.0% fat; and
d. about 0.025% flavor enhancer.

2. A feed supplement composition as described in claim 1, wherein:

a. said whey permeate is condensed to about 50% solids;
b. said dicarboxylic acid includes D,L-malic acid;
c. said fat includes edible lard; and
d. said flavor enhancer includes milk freshener.

3. A method of improving bodily productivity in animals, comprising feeding an animal feed supplement comprising soluble sugar and dicarboxylic acid selected from the group consisting of L-malic acid, D-malic acid, L-fumaric acid, D-fumaric acid, aspartic acid, citric acid, succinic acid, lactic acid and pyruvic acid and mixtures thereof, said ingredients being present in amounts sufficient to provide the rumen a pH in the range of about 6 to 7, and to increase the amount of digestible protein in the lower intestine by increasing microbial protein synthesis in the rumen.

4. A method of improving bodily productivity of animals as described in claim 3 further comprising combining said feed supplement with animal feed in an amount sufficient to assure that each animal consumes between about 0.3 pound and 1.0 pound of said feed supplement per day.

5. An improved animal feed composition comprising a mixture of animal feed and an animal feed supplement comprising soluble sugar and dicarboxylic acid selected from the group consisting of L-malic acid, D-malic acid, L-fumaric acid, D-fumaric acid, aspartic acid, citric acid, succinic acid, lactic acid and pyruvic acid and mixtures thereof, said ingredients being present in amounts sufficient to provide the rumen a pH in the range of about 6 to 7, and to increase the amount of digestible protein in the lower intestine by increasing microbial protein synthesis in the rumen.

6. A method of improving bodily productivity in animals, comprising feeding an animal feed supplement comprising soluble sugar, dicarboxylic acid selected from the group consisting of L-malic acid, D-malic acid, L-fumaric acid, D-fumaric acid, aspartic acid, citric acid, succinic acid, lactic acid and pyruvic acid and mixtures thereof and mineral salt, said ingredients being present in amounts sufficient to provide the rumen a pH in the range of about 6 to 7, and to increase the amount of digestible protein in the lower intestine by increasing microbial protein synthesis in the rumen.

7. A method of improving bodily productivity of animals as described in claim 6 further comprising combining said feed supplement with animal feed in an amount sufficient to assure that each animal consumes between about 0.3 pound and 1.0 pound of said feed supplement per day.

8. An improved animal feed composition comprising a mixture of animal feed and an animal feed supplement comprising soluble sugar, dicarboxylic acid selected from the group consisting of L-malic acid, D-malic acid, L-fumaric acid, aspartic acid, citric acid, succinic acid, lactic acid and pyruvic and mixtures thereof and mineral salt, said ingredients being present in amounts sufficient to provide the rumen a pH in the range of about 6 to 7, and to increase the amount of digestible protein in the lower intestine by increasing microbial protein synthesis in the rumen.

9. An animal feed supplement composition comprising a soluble sugar and a dicarboxylic acid selected from the group consisting of L-malic acid, D-malic acid, L-fumaric acid, D-fumaric acid, aspartic acid, citric acid, succinic acid, lactic acid and pyruvic acid and mixtures thereof, said ingredients being present in the amounts sufficient to provide the rumen a pH in the range of about 6 to 7, and to increase the amount of digestible protein in the lower intestine by increasing microbial protein synthesis in the rumen.

10. A feed supplement composition as described in claim 1, wherein said soluble sugar is selected from the group consisting of lactose, maltose, sucrose, dextrose, maltodextrin, fructose, xylose, galactose, ribose, and mixtures thereof.

11. A feed supplement composition as described in claim 1 wherein said soluble sugar is comprised of lactose, dextrose, maltodextrin and sucrose.

12. A feed supplement composition as described in claim 1 wherein said soluble sugar comprises between about 50% and 98% soluble sugar by weight of said composition.

13. A feed supplement composition as described in claim 12 wherein said soluble sugar is comprised of lactose, dextrose, maltodextrin and sucrose.

14. A feed supplement composition as described in claim 13 wherein said lactose is about 75% by weight of said composition, said dextrose and maltodextrin are combined to about 1%, and said sucrose is about 2.4%.

15. A feed supplement composition as described in claim 1 wherein said dicarboxylic acid is malic acid.

16. A feed supplement composition as described in claim 1 wherein said dicarboxylic acid is between about 0.5% and 10% by weight of said composition.

17. A feed supplement composition as described in claim 1 wherein said dicarboxylic acid is comprised of approximately 1.8% D,L-malic acid.

18. A feed supplement composition as described in claim 1, further comprising at least one mineral salt.

19. A feed supplement composition as described in claim 18, wherein said mineral salt is selected from the group consisting of sodium chloride, potassium chloride, calcium chloride, magnesium sulfate, copper sulfate, zinc sulfate, sodium bicarbonate, and mixtures thereof.

20. A feed supplement composition as described in claim 18 wherein said mineral salt is comprised of sodium chloride.

21. A feed supplement composition as described in claim 18 wherein said mineral salt comprises between about 5.0% and 20% mineral salt by weight of said composition.

22. A feed supplement composition as described in claim 18, further comprising fat.

23. A feed supplement composition as described in claim 22 wherein said fat is selected from the group consisting of edible lard and tallow, and mixtures thereof.

24. A feed supplement composition as described in claim 22 wherein said fat comprises between about 0.5% and 5% by composition weight.

25. A feed supplement composition as described in claim 22 wherein said fat comprises about 1% by composition weight.

26. A feed supplement composition as described in claim 18, further comprising flavor enhancer.

27. A feed supplement composition as described in claim 18 wherein said mineral salt comprises whey permeate.

28. A feed supplement composition as described in claim 18 wherein said soluble sugar is comprised of corn syrup solids.

29. A feed supplement composition as described in the claim 28 wherein said corn syrup solids comprises between about 1% and 10% by composition weight.

30. A feed supplement composition as described in claim 9 wherein said ingredients are comprised of:
    a. soluble sugar of about 75% lactose, 1.0% combined dextrose and maltodextrin, and 2.4% sucrose; and
    b. dicarboxylic acid of about 0.9% L-malic acid.

31. A feed supplement composition as described in claim 9 wherein said soluble sugar comprised whey permeate.

32. A feed supplement composition as described in claim 31 wherein said composition is comprised of between about 50% and 98% whey permeate by composition weight.

33. A feed supplement composition as described in claim 9, wherein said soluble sugar is comprised of corn syrup solids.

34. A feed supplement composition as described in the claim 33 wherein said corn syrup solids is between about 1% and 10% by composition weight.

35. An animal feed supplement composition comprising soluble sugar between about 50% and 98% by weight of said composition, dicarboxylic acid selected from the group consisting of L-malic acid, D-malic acid, L-fumaric acid, aspartic acid, citric acid, succinic acid, lactic acid and pyruvic acid and mixtures thereof between about 0.5% and 10%, and mineral salt between about 5% and 20%, sufficient to provide the rumen a pH in the range of about 6 to 7, and to increase the amount of digestible protein in the lower intestine by increasing microbial protein synthesis in the rumen.

36. A feed supplement composition as described in claim 35 wherein said ingredients comprise:
    a. about 78.4% soluble sugar by weight of said composition;
    b. about 1.8% dicarboxylic acid; and
    c. about 10.5% mineral salt.

* * * * *